United States Patent [19]
Rosen et al.

[11] Patent Number: 5,761,188
[45] Date of Patent: Jun. 2, 1998

[54] OPTICAL DATA STORAGE SYSTEM WITH MULTIPLE REWRITABLE PHASE CHANGE RECORDING LAYERS

[75] Inventors: Hal Jervis Rosen, Los Gatos; Kurt Allan Rubin, Santa Clara; Wade Wai-Chung Tang, San Jose, all of Calif.

[73] Assignee: International Business Machines Corporation, Armonk, N.Y.

[21] Appl. No.: 893,030

[22] Filed: Jul. 15, 1997

Related U.S. Application Data

[63] Continuation of Ser. No. 654,408, May 28, 1996, abandoned.
[51] Int. Cl.$^6$ ............................................. G11B 7/24
[52] U.S. Cl. ............................................. 369/275.2
[58] Field of Search ................ 369/112, 275.1–275.4, 369/116, 94

[56] References Cited

U.S. PATENT DOCUMENTS

| | | | |
|---|---|---|---|
| 5,373,499 | 12/1994 | Imaino et al. | 369/94 |
| 5,449,590 | 9/1995 | Imaino et al. | 369/94 |
| 5,555,537 | 9/1996 | Imaino et al. | 369/275.1 |
| 5,563,873 | 10/1996 | Ito et al. | 369/94 |

*Primary Examiner*—Nabil Hindi
*Attorney, Agent, or Firm*—Thomas R. Berthold

[57] ABSTRACT

A multiple recording layer rewriteable phase-change optical disk and disk drive uses a reverse writing type of reversible phase-change material as the recording layer nearest the incident laser light. The disk has a light-transmissive substrate onto which the laser light is incident. The substrate supports at least two spatially-separated multilayer recording stacks, each stack including an active recording layer of reversible or rewriteable phase-change material. The recording stack located nearest the substrate on which the laser light is incident includes a reverse writing type of reversible phase change material, i.e., a phase-change material with an amorphous starting phase that is recorded onto by laser heating that converts data regions to the crystalline phase. This first recording layer has a dielectric layer in contact with it that has a high index of refraction relative to the adjacent recording layer and that acts as an optical interference film to provide a constructive optical interference effect in the recording stack. The optical interference film optimizes the contrast, reflectivity, and transmissivity of the recording stack. The optical interference film is also non-absorbing so that laser light can pass through it to focus on a recording layer in a farther recording stack. This allows the farther recording layer to be written using reasonable laser power.

21 Claims, 6 Drawing Sheets

OPTICAL DATA STORAGE SYSTEM WITH MULTIPLE REWRITABLE PHASE CHANGE RECORDING LAYERS

This is a continuation of application Ser. No. 08/654,408 filed on May 28, 1996, now abandoned.

TECHNICAL FIELD

This invention relates generally to optical data storage systems and more specifically to such a system using an optical medium having multiple recording layers.

BACKGROUND OF THE INVENTION

Optical data storage systems, such as optical disk drives, allow the storage of large quantities of data on the optical medium. The data is accessed by focusing a laser beam onto the recording layer of the medium and then detecting the reflected light beam.

In write-once read-many (WORM) systems, the laser writes data by making permanent marks on the recording layer. Once the data is recorded onto the medium it cannot be erased. One example is a phase-change WORM system which uses phase-change alloys as the recording material and a laser beam that writes data by locally converting the phase-change media from a first structural phase to a second structural phase. The WORM function is achieved because the medium is designed so that the second structural phase does not convert back easily to the first structural phase, thereby resulting in permanently recorded data bits.

In contrast, a reversible or rewriteable phase-change system uses media that has two stable phases. A data bit is stored on the media by converting a small local area to one stable phase. The data bit can be erased by reverting the written area back to the starting phase. The starting phase is typically a crystalline phase and the laser beam writes data by locally converting the material in the data layer to a stable amorphous phase. This is done when the crystalline region is heated above its melting point and then cooled quickly so disordered structure gets fixed in place, resulting in an amorphous structure. The data bit can later be erased by converting the amorphous phase back to the starting crystalline phase. This is done when the amorphous region is heated and maintained at or above its crystallization temperature, or alternatively melted and slowly cooled until the region is crystallized. The data in this type of phase-change system is read or detected as a change in reflectivity between a crystalline region and an amorphous region on the medium.

Reversible or rewriteable phase-change optical recording systems are also known where the initial or unwritten state is the amorphous phase of the data layer, and the written or recorded state is the crystalline phase. These types of optical recording systems are often called "reverse writing" systems. U.S. Pat. No. 5,383,172 describes a reverse writing system wherein the erasing of the written crystalline phase data layer occurs by pulsing the laser according to a specific pattern. The specific pattern of pulses is selected at laser power levels and pulse durations that prevent crystallization of unwritten amorphous regions of the data layer that are in the near vicinity of the written data that is to be erased.

To increase the storage capacity of an optical disk, multiple recording layer systems have been proposed. An optical disk having two or more recording layers may be accessed at the different spatially-separated recording layers by changing the focal position of the lens. The laser beam is transmitted through the nearer recording layer to read and write data on the farther recording layer(s). Multiple recording layer disks require that the intermediate recording layers between the disk surface onto which the laser light is incident and the last or farthest recording layer from that surface be light transmissive. Examples of this approach include U.S. Pat. Nos. 5,202,875, 5,097,464, and 4,450,553. IBM's pending application Ser. No. 08/497,518 filed Jun. 30, 1995 describes a multiple data layer optical recording system wherein the individual recording layers are formed of phase-change WORM material.

One problem with using multiple recording layers in rewriteable phase-change disks is that the conventional rewriteable structure is designed for single recording layer usage and hence has very little transmissivity. Furthermore, to improve the thermal dissipation of the recording layer, the conventional structure requires a heat-sinking metallic reflective layer located adjacent to the recording layer. The metallic reflective layer in the conventional rewriteable phase-change structure is not light transmissive so it is not possible to write on the farther recording layers. Moreover, if the metallic layer adjacent to the intermediate recording layers is removed to make the structure light transmissive, the recording layer then lacks the proper thermal dissipation characteristic that is critical in the crystalline-to-amorphous phase transition. The recording layer thus fails to function as a rewriteable phase-change recording layer.

What is needed is a multiple recording layer rewriteable phase-change optical data storage system that provides a good signal from the recording layers closer to the incident laser light, as well as allowing writing and erasing with reasonable laser power on all recording layers without the need for metallic heat-sinking layers next to the recording layers.

SUMMARY OF THE INVENTION

The invention is a multiple recording layer rewriteable phase-change optical disk and disk drive. The disk has a light-transmissive substrate onto which the laser light is incident. The substrate supports at least two spatially-separated multilayer recording stacks, each stack including an active recording layer of reversible or rewriteable phase-change material. The disk is either an air-gap structure wherein each recording stack is supported on a separate substrate and the substrates are separated by an air gap, or a solid structure wherein a solid light-transmissive spacer layer separates the recording stacks. The recording stack located nearest the substrate on which the laser light is incident includes a reverse writing type of reversible phase change material (i.e., a phase-change material with an amorphous starting phase that is recorded onto by laser heating that converts data regions to the crystalline phase). This first recording layer has a dielectric layer in contact with it that has a high index of refraction relative to the adjacent recording layer and that acts as an optical interference film to provide a constructive optical interference effect in the recording stack. The optical interference film optimizes the contrast, reflectivity, and transmissivity of the recording stack. The optical interference film is also nonabsorbing so that laser light can pass through it to focus on a recording layer in a farther recording stack. This allows the farther recording layer to be written using reasonable laser power.

For a fuller understanding of the nature and advantages of the present invention, reference should be made to the following detailed description taken together with the accompanying drawings.

DESCRIPTION OF THE PREFERRED EMBODIMENTS

Figure 1:
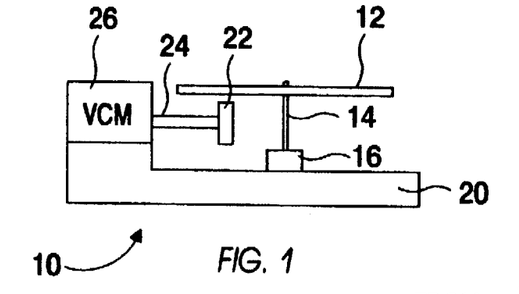
FIG. 1 is a schematic diagram of an optical disk drive system of the present invention with a multiple recording layer rewriteable phase-change optical disk.

FIG. 1 is a schematic diagram of an optical disk data storage system according to the present invention designated by the general reference number 10. System 10 includes an optical data storage disk 12 having multiple recording layers. Disk 12 is preferably removably mounted on a clamping spindle 14 as is known in the art. Spindle 14 is attached to a spindle motor 16, which in turn is attached to a system chassis 20. Motor 16 rotates spindle 14 and disk 12.

An optical head 22 is positioned below disk 12. Head 22 is attached to an arm 24, which in turn is connected to an actuator device such as a voice coil motor 26. Voice coil motor 26 is attached to chassis 20 and moves arm 24 and head 22 in a radial direction below disk 12.

Figure 2A:
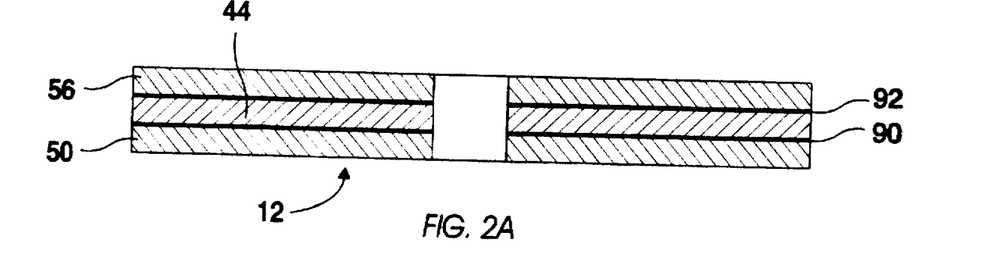
FIG. 2A is a cross-sectional view of a dual substrate laminated multiple recording layer optical disk with rewriteable phase-change recording layers.

FIG. 2A is a cross-sectional view of the multiple recording layer optical disk 12. Disk 12 has two substrates 50, 56 that are separated by a solid transparent spacer 44. Disk 12 has an outer face 49 onto which the laser beam is incident. Substrate 50 may be made of a light-transmissive material such as glass, polycarbonate, or other polymer material. Substrate 56 may be made of a similar material to substrate 50, or may be made of a material that is not transmissive of light in embodiments where the light does not have to pass through the substrate 56. In a preferred embodiment, substrates 50, 56 are 0.6 mm thick. Substrate 50 has formed on it a thin film recording stack 90, and substrate 56 has formed on it a thin film recording stack 92. Recording stacks 90, 92 each contain a recording layer of a rewriteable phase-change material and at least one transmissive dielectric layer, as will be described in detail below. In the present invention the recording layer contained in the stack 90 is a reverse writing type of phase-change material. The substrates 50, 56 have optical tracking grooves or marks and/or header information formed into the surfaces adjacent to recording stacks 90, 92, respectively, by injection molding, a photo-polymer process, or an embossing process. Alternatively, the tracking features may be pits formed in the substrates or recorded marks in the recording layers. In the preferred embodiment, the spacer 44 is made of a highly transmissive optical cement which also serves to hold the substrates 50, 56 together. The thickness of spacer 44 is preferably 10–300 microns.

Pulse width modulation (PWM) is one way to write data as marks on optical disks. In PWM, a mark can be either an individual spot (also called a submark) or a series of overlapping or contiguous submarks. PWM records information as the distance between the transitions or edges of the marks. A transition is either the beginning (leading) or end (trailing) edge of a mark. IBM's U.S. Pat. No. 5,400,313 describes a PWM magneto-optical disk drive that uses a modulator-controlled laser to emit the laser beam in a highly pulsed manner. The laser beam may be pulsed on any given write clock period and at any of several different power levels. The pulsed laser writes essentially circular submarks of substantially the same size on the disk when the power level is sufficiently high. The various PWM mark run-lengths are recorded on the disk either as a single isolated submark in the case of the shortest run-length, or as a series of contiguous or overlapping submarks in the case of longer run-lengths.

Figure 3:
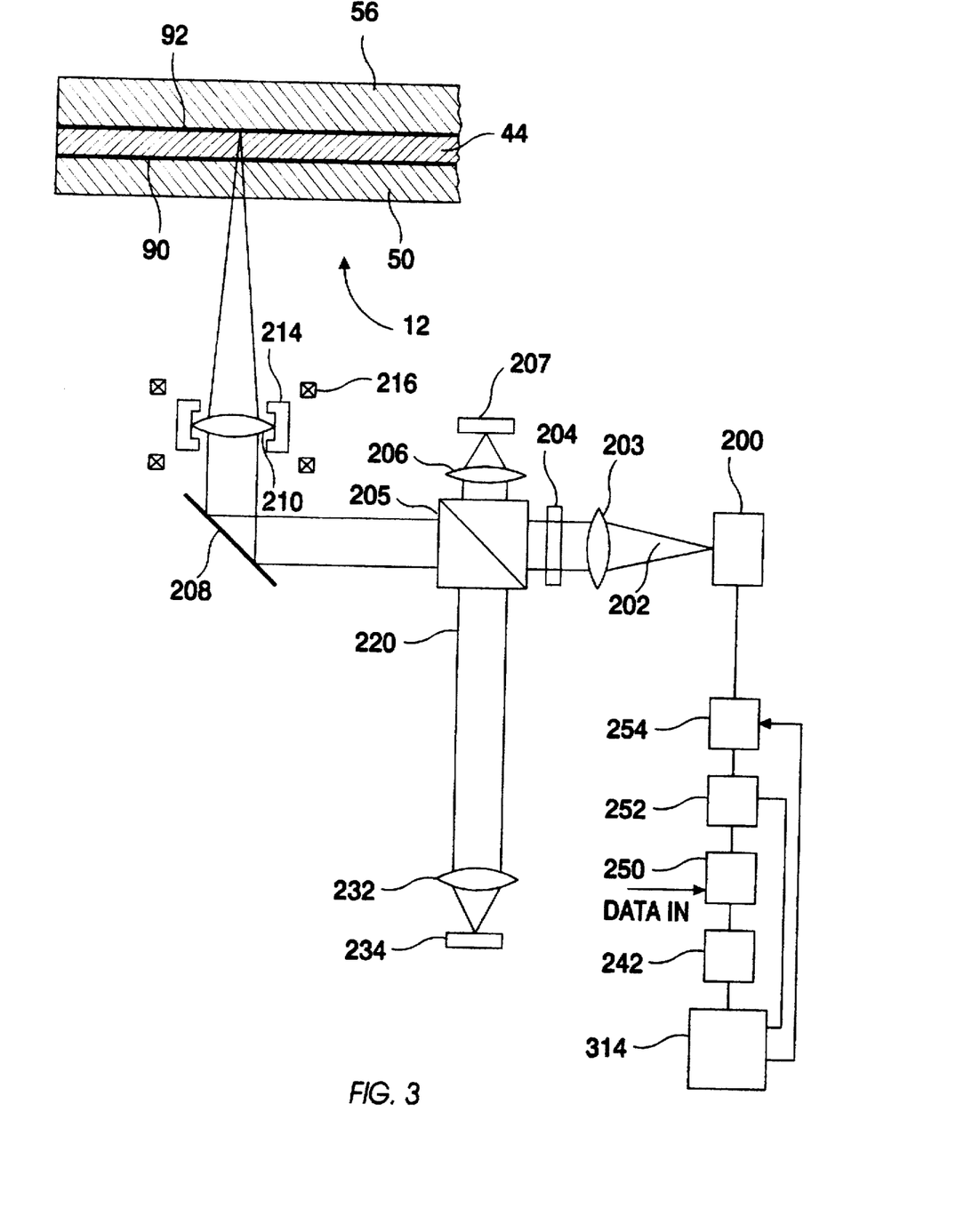
FIG. 3 is a schematic diagram of the optical disk drive wherein the optical disk is in the form of a two-recording-layer air-gap structure.

FIG. 3 shows a schematic diagram of one embodiment of a PWM optical disk drive and shows disk 12, optical head 22, and the means for controlling the laser. Optical head 22 includes a laser diode 200, which may be an indium-aluminum-gallium-phosphide diode laser producing a primary beam of light 202 at a fixed wavelength. Laser diode 200 is capable of operating at at least two power levels, i.e., a first power level that is high enough to cause the recording layers to change phase, and a second lower read power level for reading the data by reflection from the amorphous and crystalline regions in the recording layers. Typically the laser diode 200 is also capable of operating at several different write power levels to precisely position the mark edges, as described in the previously cited '313 patent.

A disk drive controller 314, as is known in the art, is connected to and provides overall control for the various drive functions. Controller 314 is connected to laser driver 254 and a variable frequency clock 242. Controller 314 adjusts the clocking speed of the clock 242 as appropriate depending upon the radial position of head 22 relative to disk 12. The clock 242 generates timing signals with a characteristic clock cycle time, $T_c$, and controls the timing of data reading and writing in the disk drive. Variable frequency clock 242, also called a frequency synthesizer, is well known in the art. The spindle motor 16 is controlled to spin at a constant angular velocity, and the linear velocity of the light beam relative to disk 12 will vary depending upon the radial position of optical head 22.

Clock 242 is connected to a PWM encoder 250. Encoder 250 receives a digital data signal from the host computer and encodes it into the desired PWM code. Encoder 250 may be a (1,7) run-length limited (RLL) PWM encoder. PWM encoders are well known in the art and implement a variety of PWM codes. There are many different encoding schemes known in the art which may be used to encode digital data into PWM marks and gaps. The most popular type of encoding schemes use run-length limited (RLL) codes. These RLL codes use a small set of run-lengths, which when used in different combinations, encode any pattern of digital data. An example of a (1,7) encoder is described in IBM's U.S. Pat. No. 4,488,142. Encoder 250 is connected to a modulator 252. Modulator 252 receives the PWM code and causes the laser 200, via the laser driver 254, to write the desired data patterns onto the data layer of the disk at the appropriate laser power level.

During the write operation the encoder 250, with its timing controlled by clock cycles from clock 242, encodes the digital data from the host computer into a PWM (1,7) RLL-encoded digital data signal. This encoded data signal is sent to the modulator 252, which converts it into instructions to the laser driver 254 for writing the desired pulsed pattern. The laser 200 is pulsed (from threshold level to the higher write level) in response to the laser driver 254 and provides a pulsed light beam at the desired power levels.

During a read operation, controller 314 causes laser driver 254 to energize laser 200 to generate a low power read level beam.

Beam 202 is collimated by lens 203, circularized by circularizer 204, and then passes to a beamsplitter 205. A portion of beam 202 is reflected by beamsplitter 205 to a lens 206 and an optical detector 207. Detector 207 is used to monitor the power of laser beam 202. Beam 202 from beamsplitter 205 next passes to and is reflected by a mirror 208. Beam 202 then passes through a focus lens 210 and is focused to a diffraction-limited spot onto one of the recording stacks 90, 92. Lens 210 is mounted in a holder 214, the position of which is adjusted relative to disk 12 by a focus actuator motor 216, which may be a voice coil motor. Movement of the lens 210 by the focus actuator motor 216 moves the focused spot between the two recording stacks 90, 92 on the substrates 50, 56 of disk 12.

In a conventional single recording layer rewriteable phase-change structure with a metallic heat dissipation reflective layer, the starting phase of the recording layer is crystalline and the recorded bits are in the amorphous phase with a lower reflectivity. However, in disk 12 of the present invention, the amorphous phase is chosen as the starting phase of the recording layer closest to the light source, i.e., in stack 90. The first recording stack 90 has a recording layer with an amorphous starting phase (recorded bits in the crystalline phase), while the second recording stack 92 can have a recording layer that has a crystalline starting phase (recorded bits in the amorphous phase). This is feasible provided there are header information bits stored in the respective recording stacks to inform the drive what reflectivity level of the recorded bits are in the respective recording stacks. The optical head must also be able to adjust the write pulse power level accordingly so as to have the capability of writing data bits on both the crystalline phase and amorphous phase. The use of a reverse writing (amorphous-to-crystalline phase) recording layer in the intermediate recording layers and conventional writing (crystalline-to-amorphous phase) in the farthest recording layer allows additional freedom in the design of high transmissive recording stacks with optimized signal-to-noise ratio on all recording layers, as will be described later.

Figure 4:
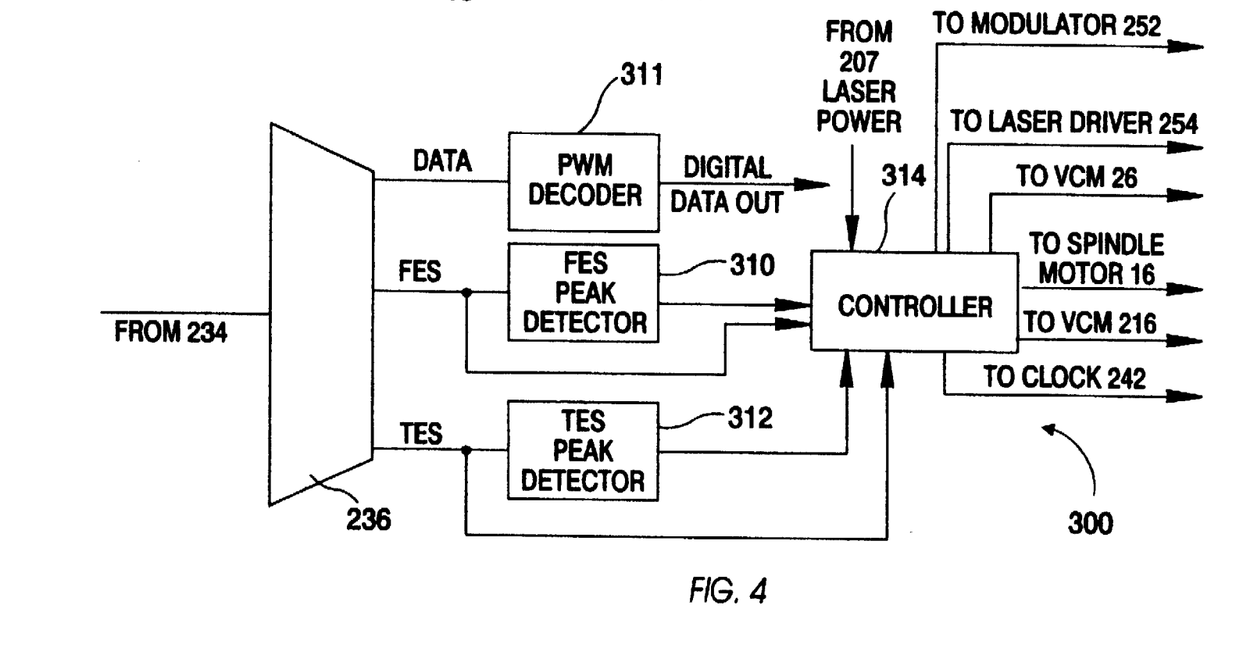
FIG. 4 is a block diagram of a controller system of the optical disk drive system of the present invention.

FIG. 4 is a block diagram of a controller system of the optical disk drive system and is designated by the general reference number 300. The multielement detector 234 (FIG. 3) generates output signals that provide a data signal, a focus error signal (FES), and a tracking error signal (TES). The signals are amplified by signal amplifier 236. The data signal is sent to a PWM decoder 311 that generates the digital output data. The FES and TES are sent directly to controller 314. A peak detector 310 also receives the FES, and a peak detector 312 also receives the TES. Controller 314 also receives input signals from FES peak detector 310, TES peak detector 312, and laser power detector 207. Controller 314 is a microprocessor-based disk drive controller. Controller 314 is also connected to and controls laser modulator 252, laser driver 254, variable frequency clock 242, head motor 26, spindle motor 16, and focus actuator motor 216.

Figure 2B:
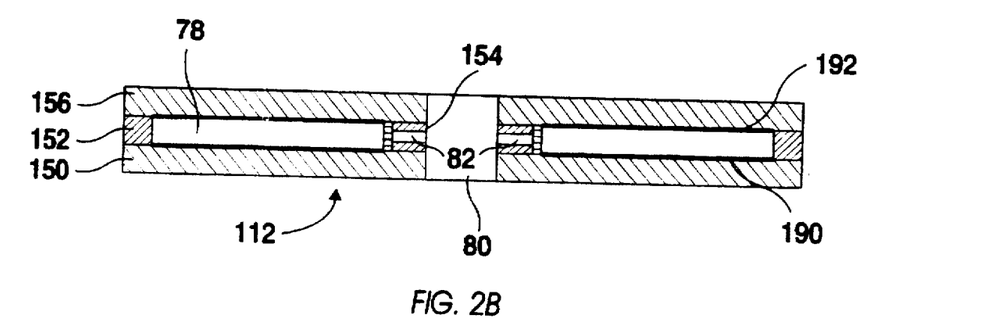
FIG. 2B is a cross-sectional view of an air-gap multiple recording layer optical disk with rewriteable phase-change recording layers.

FIG. 2B is a cross-sectional view of a first alternative embodiment of a multiple recording layer recording disk 112 that may be substituted for disk 12 in system 10. Elements of disk 112 are similar to elements of disk 12 in FIG. 2A, but disk 112 does not have a solid spacer between substrates 190, 192. Instead, an air-gap 78 separates the substrates 150, 156. An outer diameter (OD) rim 152 and an inner diameter (ID) rim 154 are attached between substrates 150, 156. The OD and ID rims 152, 154 are preferably made of a plastic material and are approximately 50–300 microns thick. The rims 152, 154 may be attached to the substrates 150, 156 by glue, cement, ultrasonic bonding, solvent bonding, or other conventional bonding processes. The rims 152, 154 may alternatively be integrally formed in the substrates 150, 156 during the substrate molding process. When in place, the rims 152, 154 form the annular air-gap 78 between the substrates 150, 156. A spindle aperture 80 passes through disk 112 inside the ID rim 154 for receiving the spindle 14. A plurality of passages 82 are provided in the ID rim 154 to connect the aperture 80 and the spaces 78 to allow pressure equalization between the spaces 78 and the surrounding environment of the disk drive. A plurality of low impedance filters 84 are attached to passages 82 to prevent contamination of spaces 78 by particulate matter in the air. Filters 84 may be quartz or glass fiber. Alternatively, passages 82 and filters 84 can be located on the OD rim 152. The recording stacks 190, 192 on respective substrates 150, 156 contain the rewriteable phase-change recording layers, with stack 190 containing a recording layer formed of reverse writing phase-change material.

Figure 2C:
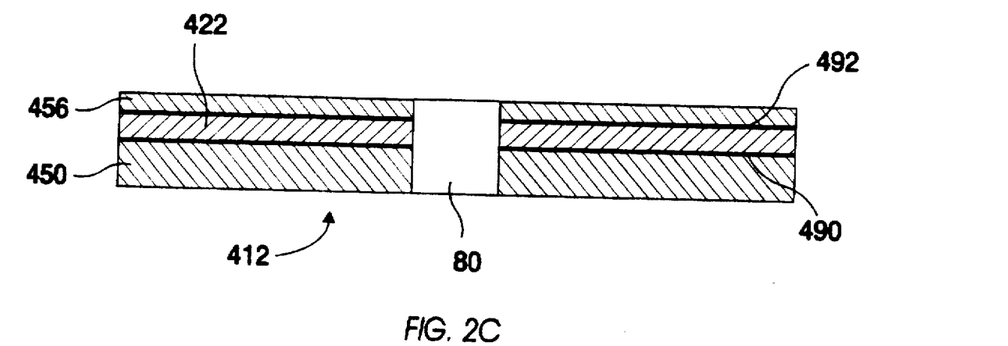
FIG. 2C is a cross-sectional view of a single substrate laminated multiple recording layer optical disk with rewriteable phase-change recording layers.

FIG. 2C is a cross-sectional view of a second alternative embodiment of a multiple recording layer disk 412 that may be substituted for disk 12 in system 10. Elements of disk 412 are similar to elements of disk 12 in FIG. 2A. However, disk 412 does not use two separate substrates as in the previous embodiments, but is a multilayer structure fabricated on a single substrate 450. The rewriteable phase-change recording stacks 490, 492 are separated by a solid spacer layer 422. Stack 490 contains a recording layer formed of reverse writing phase-change material. Spacer layer 422 is a light-transmissive layer formed by either lamination or deposition (such as a photo-polymer process or spin coating) over recording stack 490 on substrate 450. In a preferred embodiment, the light-transmissive spacer layer 422 is made of a polymer material such as photo-polymers. The top surface of layer 422 has tracking grooves and/or header information formed into its surface by either a photo-polymer process or embossing. The second rewriteable phase-change recording stack 492 is then deposited on top of spacer layer 422. A final protective layer 456 of polymer material, such as ultraviolet (UV) radiation curable spin-coated acrylate, or polycarbonate with adhesive coating, is then formed onto recording stack 492. Two disks like disk 492 can be bonded together with their respective layers 456 facing each other to make a two-sided disk. In this type of structure the two-sided disk is removed from the disk drive and flipped over so the drive can access the data layers on both sides.

The detailed description of the multiple rewriteable phase-change recording layers and their method of fabrication will be described below with respect to the disk structure of FIG. 2A. However, the multiple rewriteable phase-change recording layer system of the present invention is also operable with either of the other alternative disk structures shown and described in FIGS. 2B–2C.

Figure 5:
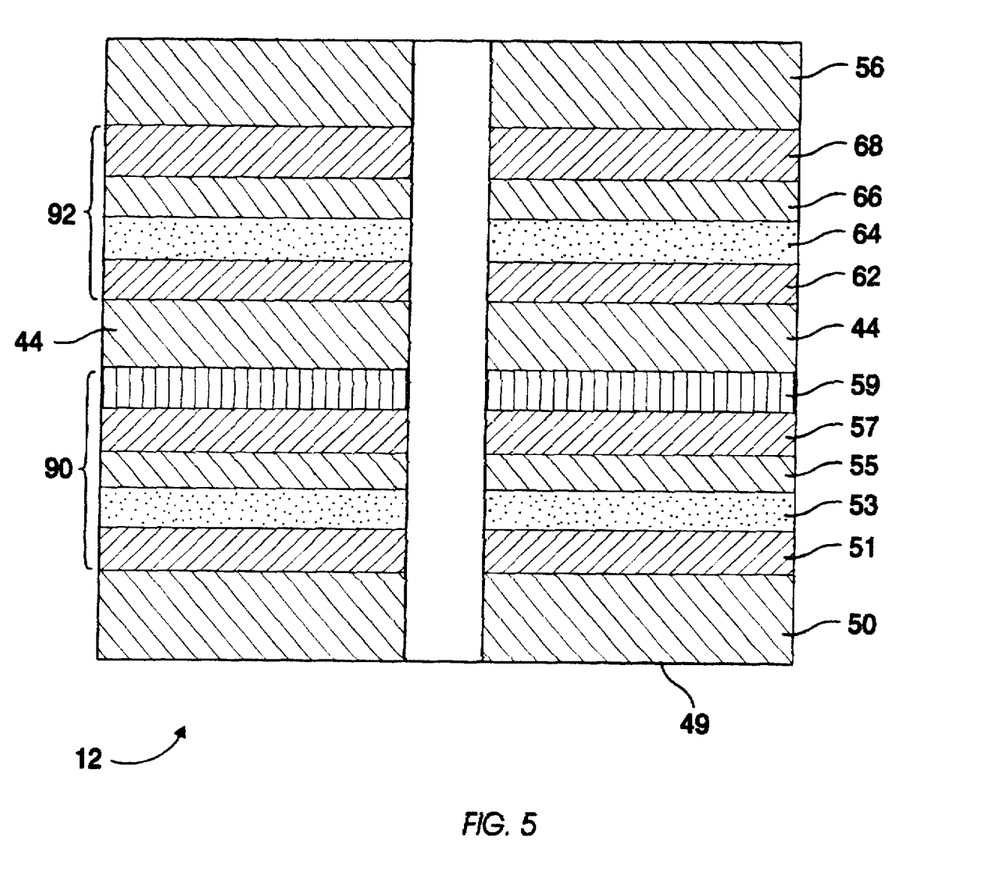
FIG. 5 is a cross-sectional view of a dual substrate laminated multiple recording layer optical disk illustrating the multiple rewriteable phase-change recording layers with adjacent optical interference films according to a preferred embodiment of the present invention.

FIG. 5 is a cross-sectional view of the optical data storage disk 12 with multiple recording stacks 90, 92, each containing a rewriteable phase-change recording layer 53, 64, respectively. Disk 12 has a substrate 50 having an outer face 49 onto which the laser light beam is incident. Substrate 50 is preferably made of polycarbonate, amorphous polyolefin (APO), polymethylmethacrylate (PMMA), or glass and is nonabsorbing at the recording wavelength. Substrate 50 has a thickness of 0.6 mm, but other thicknesses can be used. Pre-addresses and pre-grooves for the tracking servo of the laser light beam may be formed on the surface of substrate 50 opposite outer face 49. A dielectric thin layer 51 is deposited by sputtering or evaporation on substrate 50. The dielectric layer 51 acts as a protective layer so the high temperature that the recording layer 53 experiences during writing and erasing does not deform the substrate 50. Dielectric layer 51 also serves as an optical interference layer to optimize the transmissivity of the first recording stack 90 nearer the incident light beam so that data can also be written and read in the farther recording stack 92.

A layer 53 of reverse writing type of reversible phase-change material is deposited by sputtering or evaporation on dielectric layer 51 to serve as the recording layer in the first stack 90. The preferred material for layer 53 is a phase-change type alloy of $Ge_xTe_ySb_z$ (10<x<15, 45<y<55, 38<z<48; and x+y+z=100%) of thickness 5–50 nm. This type of reverse writing reversible phase-change alloy is described in the previously cited U.S. Pat. 5,383,172. However, for the composition as described in that patent, there must be a metallic heat-sinking layer adjacent to the recording layer in order for the recording layer to be rewriteable. Typically, an aluminum (Al) layer of typical thickness greater than 10 nm is used, but such a layer has light transmissivity less than 10%. Thus, this conventional recording stack is not suitable for multiple recording layer optical disks where light transmissivity must be greater than approximately 30%. Removal of the metallic heat-sinking layer to increase light transmissivity would cause other problems. This is because the composition and thickness of the reverse writing recording layer 53 (GeSbTe) would need to be reoptimized, and the adjacent dielectric layer would need to be redefined so that the crystallization time and temperature of the recording layer could be balanced to enable conversion of the material back to the amorphous phase during erasure.

In the present invention, one or more additional layers, such as optical interference layers 55, 59 and semitransparent nonmetallic heat dissipation layer 57, are deposited on recording layer 53. By use of the optical interference effects of thin films, the transmissivity, reflectivity, and absorption of the multilayer recording stack 90 (recording layer 53, dielectric layers 51, 55, 59, and nonmetallic heat dissipation layer 57) can be adjusted by varying the individual layer thicknesses. Layers 51, 53, 55, 57, 59 together form an interference structure. Constructive interference occurs if the thicknesses of the layers are properly selected, based on the thickness and the real part (n) of each layer's index of refraction. A large difference in the value of n for layers 51, 55, 57, 59 relative to the index of refraction of its adjacent layer (recording layer 53) increases the interference effect for a given layer thickness and will optimize the signal contrast and the reflectivity of the recording stack 90. Optical interference films 51, 55, 57, 59 should also have low absorption (low imaginary part of index of refraction, i.e., low extinction factor k) so that when the light spot is focused on second recording layer 64, it will transmit through recording layer 53 and layers 51, 55, 57, 59 with minimal absorption.

Dielectric materials such as Zn and/or Cr mixed with one or more of S, Se, and Te are preferred for optical interference films 51, 55, 57, 59. These materials can be deposited by sputtering, evaporation, or spin coating over substrate 50. Dielectric materials such as $SiO_x$, $TiO_x$, $ZrO_x$ and $Cu_xO$ (where x is between 1 and 2.1), SiN, SiC, amorphous Si, or organic polymers or mixtures of different dielectrics and the like, are also usable. Other suitable materials for optical interference films 51, 55, 57, 59 are oxides and nitrides of an element selected from the group consisting of Al, Ti, Zr, Cu, Hf, Ta, Nb, Cr, and W. These materials, or mixtures of these materials, may be in the amorphous or crystalline phase. If in the amorphous phase, a wide range of compositions are allowable. For example, $SiO_x$ may have a composition with 1<x<2.1. The optical interference effects are calculated using standard thin film interference calculations as described, for example, in *Optical Properties of Thin Solid Films*, O.H. Heavens, Academic Press, 1955.

Another important characteristic of layers 51, 59 is low thermal conductivity, whereas layers 55, 57 should have high thermal conductivity for heat dissipation purposes. Layer 51 is used for protecting the substrate 50 from deformation during the write/erase process so the dielectric material in layer 51 should have a high melting point and low thermal conductivity. Because there is no metallic heat dissipation layer in recording stack 90, the crystallization temperature and crystallization time of recording layer 53 must be well balanced by appropriate choices for the composition of recording layer 53 and for the thicknesses of layers 55, 57. Therefore, the heat dissipation layer 55 adjacent to layer 53 should be thermally stable and have high thermal conductivity. Thermal stability is needed to prevent the movement of the recording layer 53 while it is in the molten state during the write/erase process so as to increase its erasure cyclability. However, if a rigid, highly transmissive, highly thermally-conductive dielectric is not used for layer 55, then these functions can be shared by layers 55, 57. For example, layer 55 may be a stable, highly transmissive dielectric that is not necessary to have high thermal conductivity provided its thickness is small enough so as not to detrimentally affect the thermal conductivity of the stack 90. Layer 57 can then be a transmissive thermal conductor to dissipate heat generated in the layer 53 through dielectric layer 55. However, if layer 57 has both high rigidity and thermal conductivity, then dielectric layer 55 is not needed. In general, a nonabsorbing material with a thermal conductivity less than 0.05 W/cm-K can be used for layer 51. For layers 55, 57, a thermal conductivity of larger than 0.01 is preferred. For example, $SiO_x$ has a thermal conductivity of 0.015 W/cm-K at 400°K. Layer 59 serves the purpose of maximizing the optical interference effect of the recording stack 90 so it should have a high k value. Another function of the interference layer 59 is to optimize the reflectivity contrast of the recorded and nonrecorded regions of recording layer 53.

A solid spacer layer 44 is adjacent to the optical interference film 59 and separates the two recording stacks 90, 92. Spacer layer 44 is preferred to be nonabsorbing such as a spin-coated photo-polymer (UV-curable acrylate) or optical transparent cement that bonds the two substrates 50, 56 with their respective recording stacks 90, 92 together. The second recording stack 92 comprises a rigid transmissive dielectric layer 62 sputtered or evaporated on the second recording layer 64. Recording layer 64 is deposited on another rigid dielectric layer 66 which is adjacent to a heat dissipating layer 68 deposited on substrate 56. Since stack 92 is the last recording stack in the multiple recording layer optical disk and does not have to be light transmissive, a metallic film can be used for layer 68. With the use of a conventional heat dissipation layer 68, the composition and thickness of the second recording layer 64 has to be adjusted and will be different from the first recording layer 53. The stack 92 of second recording layer 64, dielectric layers 62, 66, and the metallic layer 68 are deposited on the second substrate 56. Substrate 56 can be formed of the same materials as substrate 50 or of opaque materials such as opaque plastic materials and metallic materials, such as aluminum.

In a preferred embodiment of optical disk 12, as shown in FIG. 5, with a laser operating at a 650 nm wavelength, substrates 50, 56 are polycarbonate of 0.6 mm thickness. First rigid dielectric layer 51 is ZnS or $SiO_2$, or a mixture of both with a thickness of 70–150 mn. First recording layer 53 is $Ge_{11}Te_{47}Sb_{42}$ of 15 nm thickness. Dielectric layer 55 is ZnS or $SiO_2$, or a mixture of both, with a thickness of 10 nm. Thermal dissipation layer 57 is amorphous Si of thickness 50 nm. Optical interference film 59 is $Si_3N_4$ of thickness 60 nm. The transmissivity of the stack 90 with these layers is 31% when the recording layer 53 is in the amorphous (or unwritten) phase, and 15% in the crystalline (or written) phase. If conventional rewriteable phase-change materials (crystalline phase as the starting phase) were used as the recording layer in stack 90, the recording stack 90 would not have an acceptable transmissivity because the laser power required to write on the second recording stack 92 through stack 90 would be too high. However, the use of reverse writing phase-change material with an amorphous starting phase (recorded bits in crystalline phase) reduces the required laser power to write on the recording layer 64 in the farther recording stack 92. When data bits are written on the recording layer 53, the layer 53 is no longer totally amorphous. However, considering that the recording track width/track pitch is typically one half and that there are amorphous regions of bit spacing, even for a fully recorded layer, the percentage of the recording layer that is still in the amorphous phase would still be typically greater than 70%.

Such a reverse writing type of rewriteable phase-change recording structure with a transmissivity greater than 30% and a reflectivity greater than 10% is required for reliable operation with good signal to noise with existing laser diode sources. The spacer layer 44 is a UV-curable, spin-coated photo-polymer of 200 microns thickness. The dielectric layer 62 for the stack 92 is ZnS or $SiO_2$, or a mixture of both, with a thickness of 100 nm. The second recording layer 64 in stack 92 is formed of a conventional type of rewriteable phase-change material (a non reverse writing alloy of GeTeSb) with a 25 nm thickness. The second dielectric layer 66 is ZnS or $SiO_2$, or a mixture of both, with a thickness of 15 nm. The metallic heat dissipation layer 68 is Al of 100 nm thickness. If the laser light is of a shorter wavelength, to reduce the spot size and thereby increase the recording density, adjustment of the thickness of heat dissipation layer 57 and dielectric layer 59 is needed. For example, for laser light at a 500 nm wavelength, the thickness of layers 57, 59 is optimally at 25 nm and 65 nm, respectively.

In a particular example of a semitransparent recording stack 90 of a dual recording layer disk similar to the above-described preferred embodiment described and shown by FIG. 5, the recording layer 53 for recording stack 90 was formed of $Ge_{11}Te_{47}Sb_{42}$. The transparent dielectric layers 51, 55 were formed of $SiO_2$. Semitransparent heat dissipating layer 57 was formed of amorphous Si and the optical interference film 59 was formed of $Si_3N_4$. The stack 90 was deposited on a polycarbonate substrate 50. The dielectric layer 51 was sputter deposited to a thickness of 70 nm on substrate 50. The recording layer 53 was 15 nm thick and sputter deposited on layer 51. Second dielectric layer 55 of thickness 1 nm was sputtered on layer 53. Layer 57 was amorphous Si of thickness 50 nm sputtered on dielectric layer 55. The optical interference layer 59 was 75 nm thick and sputtered on dielectric layer 57. For the recording stack 92, the recording layer 64 was formed of a non reverse writing alloy of GeTeSb. The transparent dielectric layers 62, 66 were formed of a mixture of ZnS (80%)+$SiO_2$ (20%). Metallic heat dissipation layer 68 was formed of Al. The stack 92 was deposited on polycarbonate substrate 56. The two recording stacks 90, 92 had values of transmissivity, reflectivity, and absorption at 780 nm wavelength as shown in Table 1 below:

TABLE 1

| Recording Stack (See Fig. 5) | Thickness (nm) | Transmissivity (%) | Reflectivity (%) | Absorption (%) |
|---|---|---|---|---|
| Stack 90 | 225 | 36 | 29 | 35 |
| Stack 92 | 245 | 0 | 20 | 80 |

This two-recording-layer disk was tested on a dynamic test stand. A laser beam of 780 nm wavelength was focused through a 0.55 numerical aperture lens. The disk was rotated so that the local media velocity was 10.7 m/s. Because the starting phase of layer 53 in stack 90 is amorphous, written data bits were in the crystalline phase. Laser pulses of 8 clock cycles length ($8T_c$) were used to record PWM data. Each clock cycle ($T_c$) was 30 ns. To erase these data bits on the first recording layer 53 and convert the written regions back to the starting amorphous phase, a train of 20 ns pulses at a duty cycle of 67% was used. The power level of the laser during erasing is set at the highest write power level, but the duration of each erase pulse is shorter than a write pulse. This pulsed erasing assures that unwritten amorphous regions adjacent the written crystalline regions are not cyrstallized during the erasure. For the second recording layer 64 in stack 92, the starting phase of the recording layer 64 was in crystalline phase. The choice of starting phase for this second recording layer is not critical, and the amorphous phase can be used as the starting phase as well. However, for each particular starting phase, the optical interference structure has to be designed so that reflectivity and signal contrast from the recording stack is optimized. Laser pulses of 20 ns were used to record PWM data of $8T_c$ length on the second recording layer 64. Each clock cycle ($T_c$) was 35.4 ns.

Figure 6:
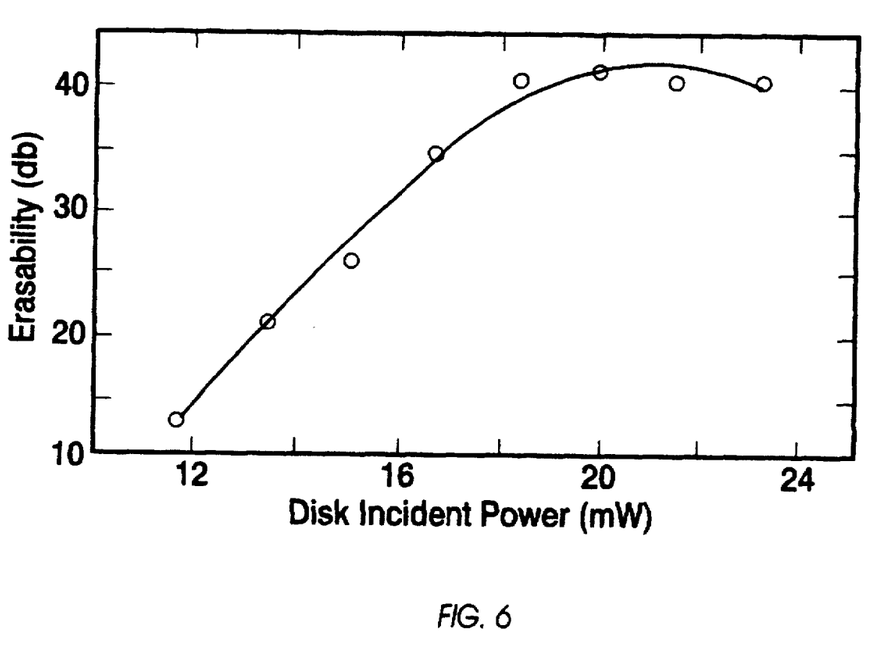
FIG. 6 is a graph of erasability, using pulsed erase, as a function of the erase power for the first data layer of a two-recording-layer disk according to the present invention.

FIG. 6 shows the erasability (in db) of the first recording layer 53 by the method of pulsed erase. Erasability is the change in signal strength from the recorded to the erased state. Good erasability is generally any value greater than approximately 25 db. FIG. 6 shows that erasability of greater than 30 db can be obtained, thus indicating the feasibility of pulsed erasing of the reverse writing type of rewriteable phase-change material in the first recording stack.

Figure 7A:
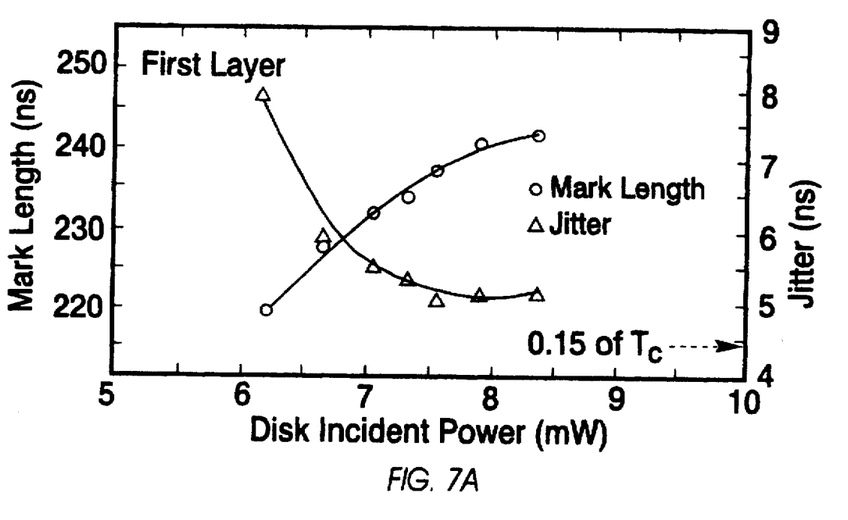
FIG. 7A is a graph of readback data jitter and mark length as a function of laser write power for the first data layer of a two-recording-layer disk according to the present invention.
Figure 7B:
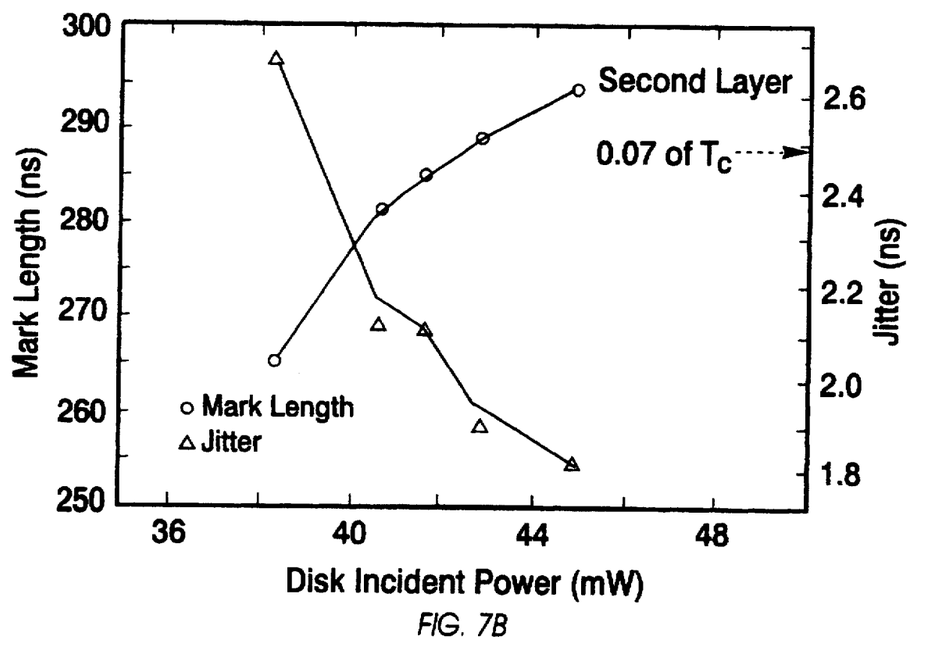
FIG. 7B is a graph of readback data jitter and mark length as a function of laser write power for the second data layer of a two-recording-layer disk according to the present invention.

FIGS. 7A and 7B are graphs of readback data of mark leading edge to trailing edge (LE-TE) "jitter" for each of the two recording layers as a function of laser write power. Jitter is a measure of the deviation of the written mark transitions from their ideal locations on the disk. Low mark length jitter at the correct mark length is important to ensure that data is read back with minimal errors. As shown in FIGS. 7A–7B, the readback data on both recording layers, at the correct mark length of $8T_c$, exhibited acceptable levels of jitter. The write power needed to achieve this low jitter is higher for the second recording stack 92 because the write beam has to pass through the first recording stack 90 that has a transmissivity of 36%. A laser power of 50 mW is still feasible for presently available semiconductor lasers, especially since short pulses of 20 ns are needed.

The preferred embodiment of the present invention has been described for a structure as shown in FIG. 2A, but is fully applicable with the other disk structures shown in FIGS. 2B–2C. The present invention has been described and shown in the drawings for a multiple recording layer disk with only two recording stacks. However, it is possible to have more than two recording stacks. One or more additional recording stacks with rewriteable phase-change layers and associated optical interference films can be located between the first and second recording stacks 90, 92. However, the important criterion is to have an effective thermal conductor adjacent the recording layer to dissipate heat so that the recording layer can be effectively toggled between the amorphous and crystalline phases. This thermal conductor layer must have very low absorption at the recording wavelength.

The preferred material for the conventional reversible phase-change material used in the farther recording stack 92 is an alloy of $Ge_xTe_ySb_z$. However, other material compositions that undergo a reversible amorphous-to-crystalline transformation and have a reflectivity difference associated with those two structurally distinct states may be used for the recording layer 64. A general principle guiding the choice of applicable compositions is that the reversible phase-change materials be at or close to a stoichiometric composition. This is a composition at which little or no phase separation occurs during crystallization so that a large number of cycles between the amorphous phase and crystalline phase can be obtained. The crystallization speed of the material is preferred to be slow if there is no heat dissipation layer in direct contact with it. For fast crystallization materials, there should be a high thermal conductivity material, such as a highly transmissive thermal conducting layer, either in direct contact with the recording layer or separated from it by a thin (e.g., less than approximately 30 nm) dielectric layer.

Among the materials which are suitable for use as the farther recording layer 64 are binary materials GeTe, SnTe, PbTe, SbSe, $Sb_2Se_3$, $Sb_{(1-x)}Se$ with $0<x<0.4$, $Bi_2Se$, $Sbi_2Se_3$, $Bi_2Te$, BiTe, $Bi_2Te_3$, $Sb_2Te$, SbTe, $Sb_2Te_3$, TeSi, $Ag_2Se$, $AgSe_2$, $Ag_2Te$, $Ag_3Te_2$, $AgTe_2$, $Au_2Se_3$, $AuTe_2$, GaSb, and GeSe, or a combination of the above. Also useful are ternary compounds with compositions along the pseudo-binary GeTe—$Sb_2Te_3$ tieline such as $GeSb_2Te_4$, $Ge_2Sb_2Te_5$, and $GeSb_4Te_7$, and materials with compositions along the InSb-GaSb tieline. Additionally, these compositions can be slightly off stoichiometry and crystallize extremely quickly by adding nucleating agents such as Sb, Ti, Pd, Sn, or Cr. Other materials include $In_3SbTe_2$ and $(AgSbTe)_x(In_{1-y}Sb_y)_{1-x}$. For each of these materials, new thicknesses for the nonabsorbing layers 51, 55, 57, 59, 62, 66 are determined based on the teaching described above.

The preferred material for the nearer recording layer 53 is a reverse writing type of reversible phase-change material of $Ge_xTe_ySb_z$ ($10<x<15$, $45<y<55$, $38<z<48$; and $x+y+z=100\%$). Other choices of reverse writing phase-change materials are materials that have a crystallization time longer than approximately 0.25 microseconds. This time means that for the particular linear velocity of the data track, i.e., 5 m/sec. in this example, this time of 0.25 microseconds is long enough so that subsequent laser pulses will not hit the same physical location which would prevent that location from going from the crystalline phase to the amorphous phase. This longer crystallization time is desirable because of the slower heat dissipation of layers 55 and 57. In contrast, farther layer 64 does not have this restriction and a shorter crystallization time is allowed since layer 64 has the benefit of an effecient heat dissipating metallic layer 68. These additional reverse writing materials include the materials described previously for use as the farther recording layer 64 but with compositions varied to provide the desired crystallization time.

The invention has been described in the embodiment of an optical disk drive. However, there are other types of optical data storage systems to which the invention is applicable. These systems usually have the feature that the medium upon which the data is stored can be removed. The common systems are those using optical media in the form of a tape or card. The drive associated with the tape or card moves the tape or card by translation, instead of rotation in the case of a disk, for the reading and writing of data. It is desirable to also increase the data storage capacity of optical tape and cards by the use of multiple recording layers of rewriteable phase-change material. In the optical tape or card, the multiple recording stacks may be supported on an opaque substrate and covered with a transparent protective layer onto which the laser light is incident. In this case, the protective layer functions like the previously described disk substrate. Both the tape or card protective layer and the disk substrate are transparent members that have an outer surface onto which the laser light is incident and through which the laser light travels to the recording stacks.

While the preferred embodiments of the present invention have been illustrated in detail, it should be apparent that modifications and improvements may be made to the invention without departing from the spirit and scope of the invention as described in the following claims.

What is claimed is:

1. An optical data storage system comprising:
    a laser light source for generating laser light at a predetermined wavelength, the laser light source being adjustable to different power levels;
    an optical medium comprising (a) a first member transmissive to the light and having a first surface that forms a medium outer face onto which the laser light is incident; (b) a first recording layer of phase-change alloy having a composition of the form $Ge_xTe_ySb_z$ (where $10<x<15$, $45<y<55$, $38<z<48$ and $x+y+z=100$) and spaced from the medium outer face by the member, the first recording layer having an amorphous starting phase convertible to a crystalline phase and reversible back to the amorphous phase upon receipt of laser light; (c) an optical interference film in contact with the first recording layer and transmissive to the light, the optical interference film having an index of refraction significantly different from the index of refraction of the first recording layer and a thickness sufficient to provide constructive interference of the light, the first recording layer and the optical interference film in contact with it being light transmissive; and (d) a second recording layer of reversible phase-change material having a crystalline starting phase convertible to an amorphous phase upon receipt of laser light at a power level higher than the power level to convert the first recording layer from its amorphous starting phase to the crystalline phase, the second recording layer being spaced from the first recording layer;

a lens located between the laser light source and said first surface of the member for focusing the laser light to a spot; and means connected to the lens for moving the lens relative to the medium so the focused spot can be moved from one recording layer to another recording layer; whereby the laser light is transmitted through the first recording layer and the optical interference film in contact with it when the spot is focused on the second recording layer to change the phase of the material in the second recording layer.

2. The system according to claim 1 wherein the optical data storage system is an optical disk drive system, wherein the optical medium is an optical disk, and wherein the first member onto which the laser light is incident is a substrate.

3. The disk drive system according to claim 2 wherein the optical disk further comprises a spacer layer transmissive to the light and located between and separating the first and second recording layers by the thickness of said spacer layer.

4. The disk drive system according to claim 1 wherein the second recording layer is formed on the spacer layer.

5. The disk drive system according to claim 1 further comprising a metallic light reflective film formed on and in contact with the second recording layer.

6. The disk drive system according to claim 2 wherein the optical disk further comprises a second substrate, and wherein the second recording layer is formed on the second substrate and the first and second substrates are spaced apart by an air gap.

7. The disk drive system according to claim 2 further comprising a dielectric layer formed on the surface of the substrate opposite the disk outer face for protecting the substrate during heating of the first recording layer, wherein the first recording layer is formed on and in contact with the dielectric layer on the substrate, and wherein the optical interference film is formed on and in contact with the first recording layer, the optical interference film having a thermal conductivity higher than that of the dielectric film formed on the substrate.

8. The disk drive system according to claim 2 further comprising a second optical interference film formed on and in contact with the first optical interference film.

9. The disk drive system according to claim 2 wherein the optical interference film of the optical disk is a material selected from the group consisting of an oxide of Si, a nitride of Si, a carbide of Si, amorphous Si, and indium-tin-oxide.

10. The disk drive system according to claim 2 wherein the optical interference film of the optical disk comprises an oxide or nitride of an element selected from the group consisting of Al, Ti, Zr, Cu, Hf, Ta, Nb, Cr, and W.

11. The disk drive system according to claim 2 wherein the optical interference film of the optical disk comprises Zn or Cr mixed with one or more of the elements selected from a group consisting of S, Se, and Te.

12. An optical data recording medium comprising (a) a first light transmissive substrate having a first surface that forms an outer face for receipt of incident laser light and a second surface opposite said first surface; (b) a first recording layer of reverse writing phase-change alloy having a composition of the form $Ge_xTe_ySb_z$ (where $10<x<15$, $45<y<55$, $38<z<48$ and $x+y+z=100$) formed on the second surface of the first substrate and spaced from the substrate outer face by the thickness of the first substrate, the first recording layer having an amorphous starting phase convertible to a crystalline phase and reversible back to the amorphous phase; (c) an optical interference film in contact with the first recording layer and transmissive to the light, the optical interference film having an index of refraction significantly different from the index of refraction of the first recording layer and a thickness sufficient to provide constructive interference of the light, the first recording layer and the optical interference film in contact with it being light transmissive; and (d) a second recording layer of reversible phase-change material having a crystalline starting phase convertible to an amorphous phase, the second recording layer being spaced from the first recording layer.

13. The optical medium according to claim 12 wherein the optical medium is an optical disk.

14. The optical disk according to claim 13 further comprising a spacer layer transmissive to the light and located between and separating the first and second recording layers by the thickness of said spacer layer.

15. The optical disk according to claim 14 wherein the second recording layer is formed on the spacer layer.

16. The optical disk according to claim 13 further comprising a second substrate and wherein the second recording layer is formed on the second substrate and the first and second substrates are spaced apart by an air gap.

17. The optical disk according to claim 13 further comprising a dielectric layer formed on the surface of the substrate opposite the disk outer face for protecting the substrate during heating of the first recording layer, wherein the first recording layer is formed on and in contact with the dielectric layer on the substrate, and wherein the optical interference film is formed on and in contact with the first recording layer, the optical interference film having a thermal conductivity higher than that of the dielectric film formed on the substrate.

18. The optical disk according to claim 13 further comprising a second optical interference film formed on and in contact with the first optical interference film.

19. The optical disk according to claim 13 wherein the optical interference film of the optical disk is a material selected from the group consisting of an oxide of Si, a nitride of Si, a carbide of Si, amorphous Si, and indium-tin-oxide.

20. The optical disk according to claim 13 wherein the optical interference film comprises an oxide or nitride of an element selected from the group consisting of Al, Ti, Zr, Cu, Hf, Ta, Nb, Cr, and W.

21. The optical disk according to claim 13 wherein the optical interference film comprises Zn or Cr mixed with one or more of the elements selected from a group consisting of S, Se, and Te.

* * * * *